United States Patent [19]

Magill

[11] 3,916,588

[45] Nov. 4, 1975

[54] INTEGRATED INDUSTRIAL AND URBAN AIRPORT COMPLEX WITH PASSENGER AND FREIGHT HANDLING FACILITIES

[76] Inventor: John W. Magill, 664 N. Michigan Ave., Chicago, Ill. 60611

[22] Filed: Oct. 1, 1973

[21] Appl. No.: 396,716

[52] U.S. Cl. .......................... 52/30; 52/33; 52/173; 52/175; 52/236; 52/237; 214/16.1 R; 244/114 R
[51] Int. Cl.$^2$ ........................ B64F 1/00; E04H 6/00
[58] Field of Search ........ 244/114; 52/30, 237, 174, 52/175, 173, 33, 236; 214/1 B, 16.1

[56] References Cited
UNITED STATES PATENTS

| | | | |
|---|---|---|---|
| 3,157,374 | 11/1964 | Conrey | 244/114 R |
| 3,571,990 | 3/1971 | Rossman | 244/114 R |
| D212,799 | 11/1968 | Dyer | D13/1 R |

OTHER PUBLICATIONS

Progressive Architecture, Nov. 1961, pp. 126, 127, 128, 129, 130, 131, 132, 133, 134, 135, 150, 151.

Primary Examiner—John E. Murtagh
Attorney, Agent, or Firm—Norman H. Gerlach

[57] ABSTRACT

An airport complex comprising: (a) a main multi-level terminal building having peripheral gates for the enplaning and deplaning of passengers and cargo, (b) a system of transit rails and expressways for transporting passengers to and from the airport complex and into the terminal building for selective discharge and reception thereof in the vicinity of the gates, (c) a system of rails and roads for transporting freight to the transfer buildings, (d) a system of cargo transporting rails for transporting container-enclosed cargo from the transfer buildings to selected locations within the terminal building for ultimate dispatch to the gates, and (e) a system of runways encompassing the terminal building and defining a ramp area for aircraft in the vicinity of the gates. The terminal building of the airport complex presents an outline which is conducive to uncongested mass passenger movements within the building as well as unobstructed aircraft ramp maneuvering. At one level within the multi-level terminal building, cargo rails define holding areas where the container-enclosed cargo may be switched, sorted and dispatched to various locations at such level while cargo elevators conduct such cargo selectively from one level to another. A central tower including a gate tower and a flight tower projects upwardly from the roof of the terminal building and affords visibility for aircraft in flight and for the various gates so that computerized equipment may be caused to control aircraft flight, gate assignments, and automatic cargo movement throughout the terminal building. A residential hotel building encompasses the lower region of the central tower and the portion of the terminal building roof surrounding the hotel building affords vehicle parking, car rental, heliport and other facilities. A main passenger level within the terminal building affords a wide variety of passenger conveniences such as restaurants, shops and airline passenger and baggage handling facilities. Inner and outer peripheral corridors extend completely around the building, straddle the passenger handling gate facilities, and function to alleviate the congestion which ordinarily is incident to passenger flow toward and away from the gate areas.

21 Claims, 24 Drawing Figures

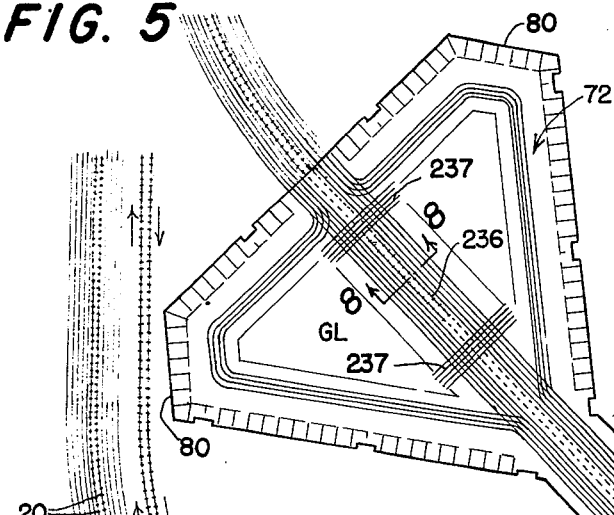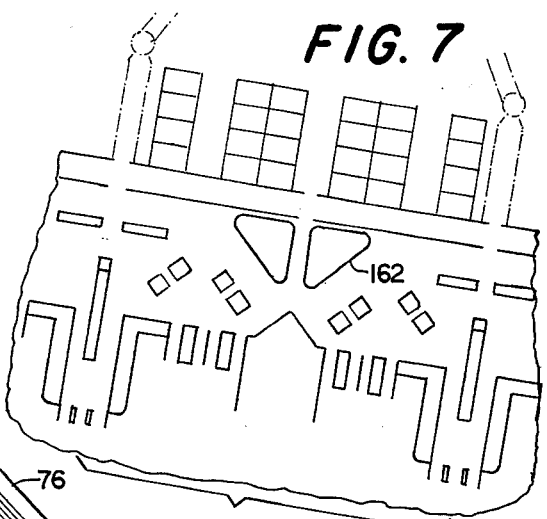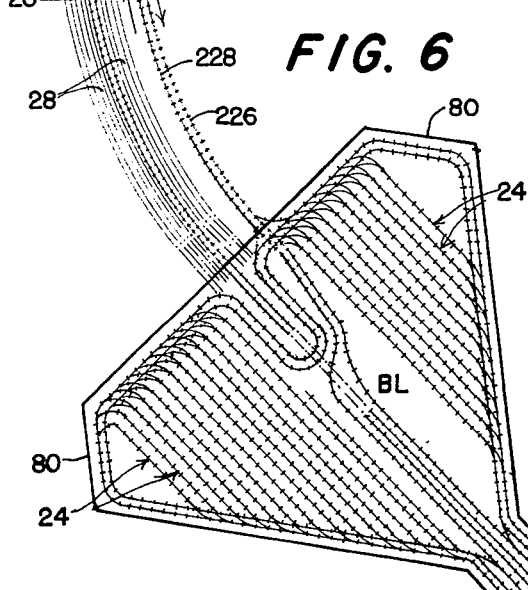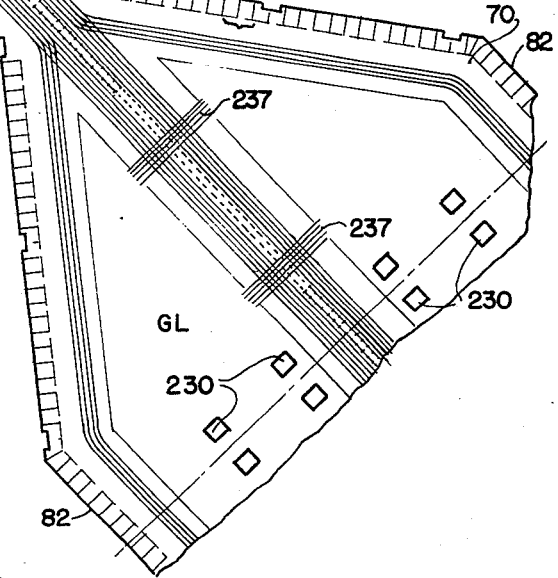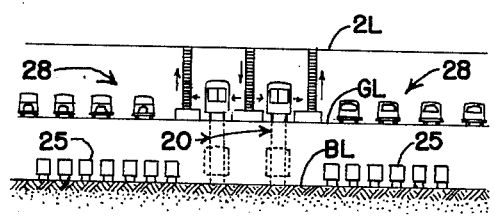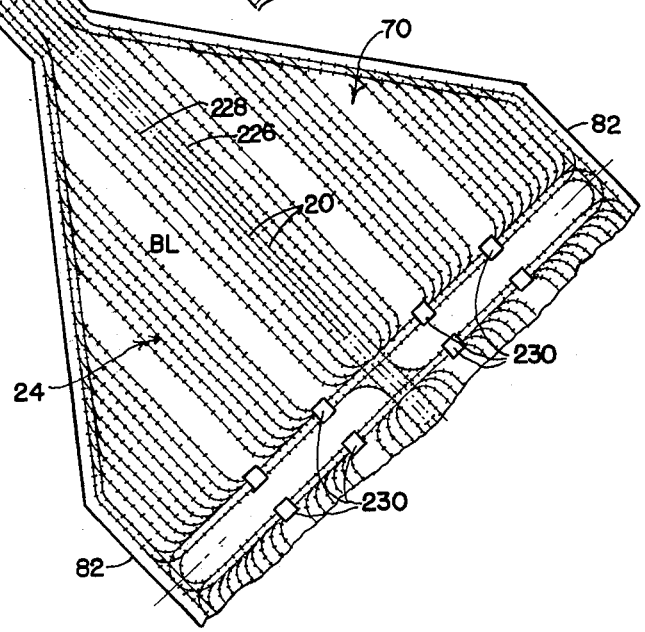

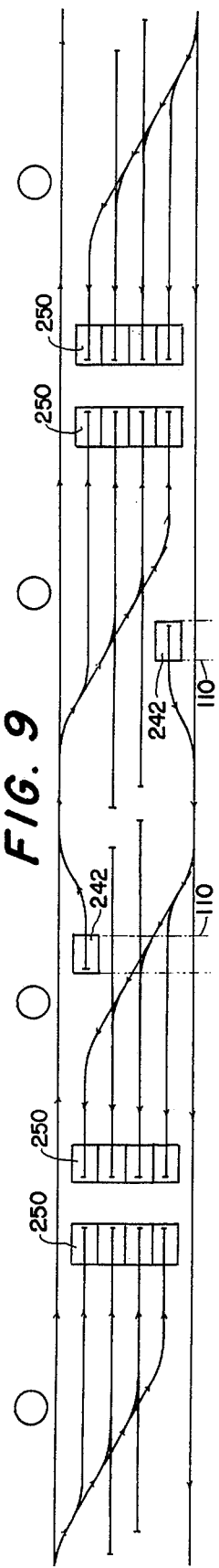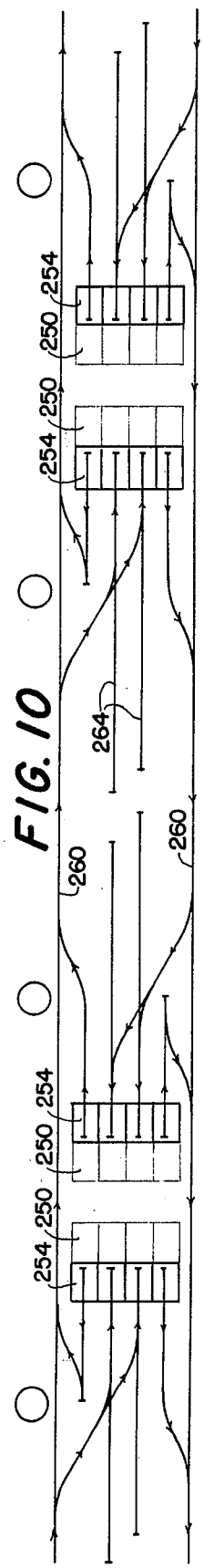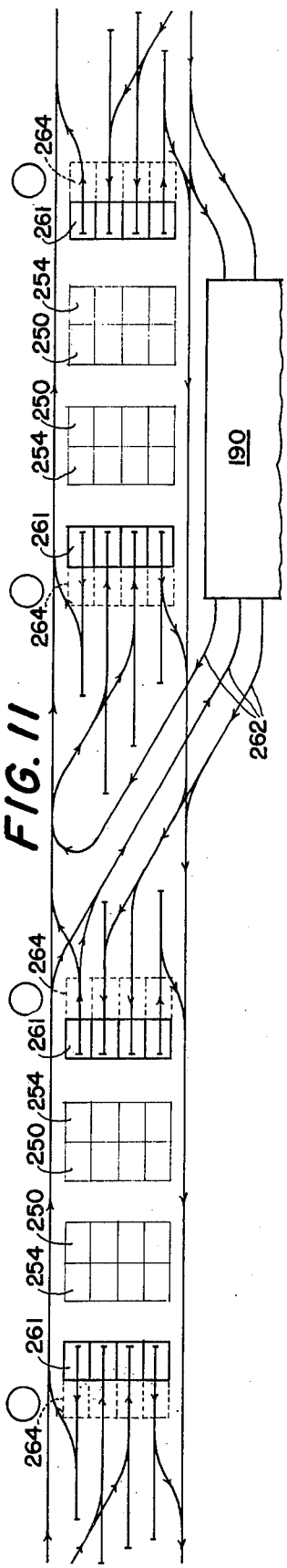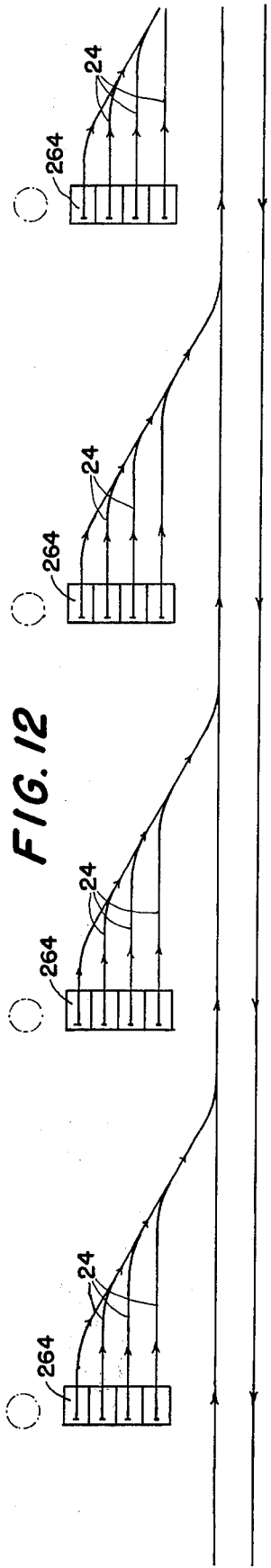

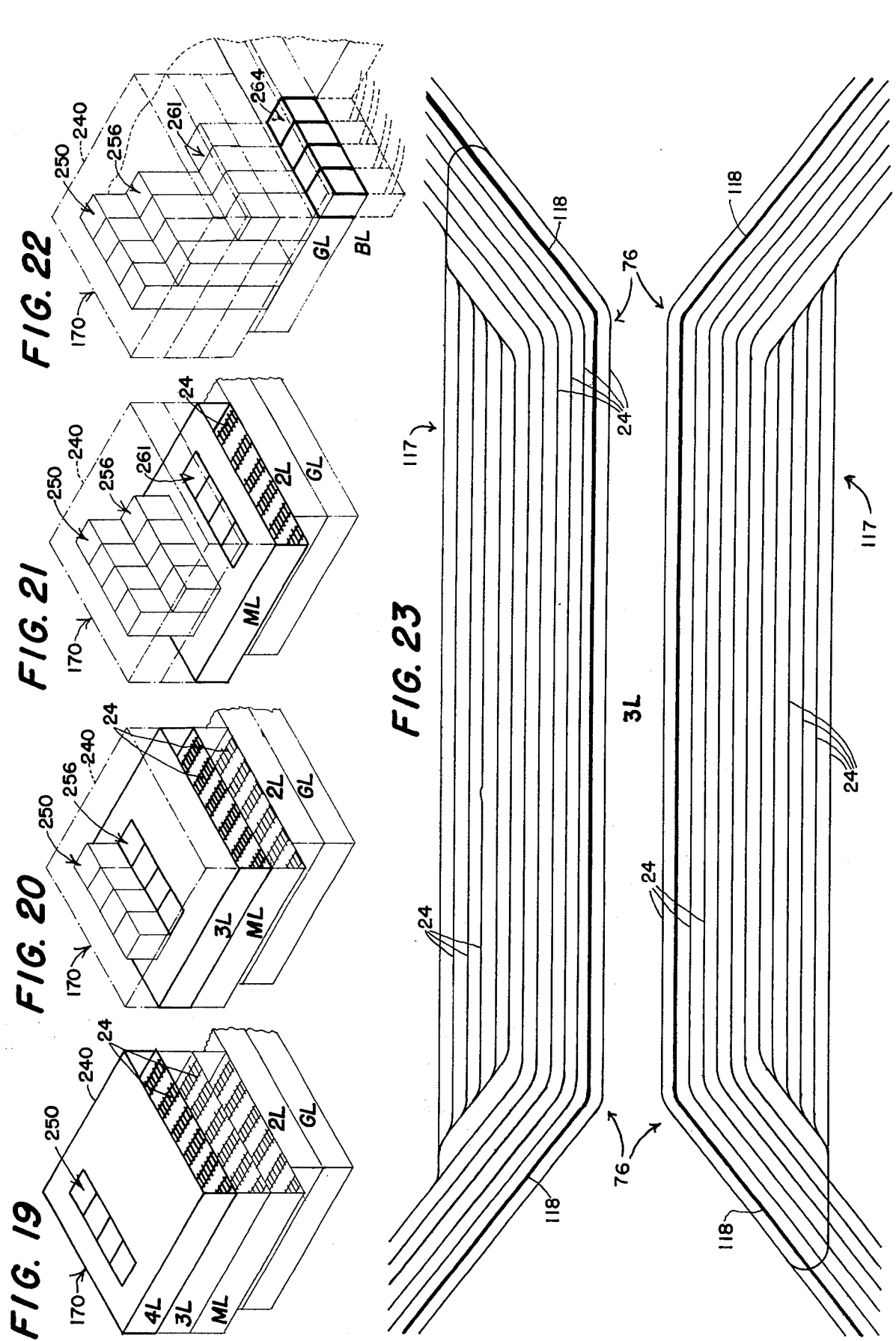

INTEGRATED INDUSTRIAL AND URBAN AIRPORT COMPLEX WITH PASSENGER AND FREIGHT HANDLING FACILITIES

The present invention relates generally to airports and has particular reference to an industrial and urban airport complex which is designed to serve an adjacent metropolitan host city, together with its suburbs and environments. The invention is particularly concerned with the provision of a novel form of terminal building which is conducive to uncongested passenger movement within the building, as well as unobstructed aircraft maneuvering in and about the adjacent ramp areas for loading and unloading purposes. The invention is also concerned with airport facilitites for transporting entraining passengers and freight from the metropolitan host city to the airport, transporting the enplaning passengers to and into the terminal building and depositing them at widely separated regions therein, processing the freight at an outlying region and conducting the same in the form of individual cargo increments to the terminal building, programming the individual cargo increments through and about the building for distribution to assigned aircraft, processing food to provide individual prepared flight meals, and distributing passengers and cargo to assigned aircraft.

Although the problem of efficiently handling passengers and cargo at an airport has been carefully studied for a number of years, the aircraft industry has not been able to keep up with the recent steady increase in the size of the aircraft and the volume of both passenger and freight traffic and the problems of handling of such passengers and freight have reached critical proportions. Passenger congestion in and around the usual airport terminal building under present-day conditions of said passenger movement to and from the various departing and arrival gates which invariably are associated with an airport terminal building, and to and from the various passenger facilities such as airline ticket desks or offices, baggage counters, rest rooms, lavatories, restaurants and the like has led to much confusion despite continued efforts to devise floor plans which are calculated to relieve such congestion. Merely enlarging any given floor plan so as to afford more room for passenger movement, although it may relieve passenger congestion to a certain extent, has the disadvantage of increasing passenger walking distance which with present-day airport building design is uncomfortably great.

Insofar as cargo handling and distribution are concerned, present-day airport design is predicted upon the maintenance of separate passenger and cargo processing facilities, the former being disposed, in the main, within the airport terminal building and the latter being disposed at an outlying area remote from the terminal building where substantially all freight handling and processing operations are performed, such freight handling area consuming considerable acreage and also necessitating a network of cargo transporting roads, rails or the like for conducting the processed cargo to the various loading gates, such roads and rails being obliged to traverse the incoming and outgoing passenger roads, rails, runways and other facilities leading to and from the terminal building and thus interfering therewith.

The large metropolitan airports which are currently in use represent just a matter of the gradual expansion of earlier established airport facilities, regardless of whether these facilities be for the handling of passengers or the distribution of cargo. Where new airports have been constructed, these represent merely an adoption of facilities formerly used in other earlier airports and their expansion to accommodate the increase in aircraft size and number and the vast increase in passenger travel. Such airport expansion is directed almost entirely to increase in size of such facilities as over-all airport acreage, runway width and length, terminal building floor space, aircraft loading ramp area, and parking lot areas, as well as duplicating or increasing the number of such facilities as auxiliary outlying buildings including freight transfer and machinery repair buildings.

Despite the comparatively great expense which is involved in enlarging existing airport facilities and also in building new and larger airports, the usual time-established systems of handling passenger and cargo within the confines of the airport proper, of transporting passengers and freight to and from the airport, and of serving the requirements of the passengers as far as their safety, convenience, and comfort are concerned, remain substantially the same and few of the associated problems have been adequately solved.

The present airport complex is designed to overcome the above-noted limitations that are attendant upon the design and construction of conventional airports and, toward this end, insofar as passenger-handling facilities are concerned, it is contemplated that the airport terminal building be so designed as to present a novel building outline which will accommodate the provision of a large number of passenger and cargo-loading gates, for example, one hundred such gates, the outline being such that aircraft maneuverability on the loading and unloading ramp in the vicinity of any given gate or group of gates is enhanced without the danger of interaircraft collision or collision between an aircraft and the building or surrounding objects in the vicinity of the building, and also being such that an aircraft may readily and repeatedly be positioned on the ramp in a loading zone in substantially the same exact position. Furthermore, the passenger and freight loading and unloading system which is contemplated by the present invention is such that the use of moving service vehicles is maintained at a minimum. Still further, the novel building outline of the terminal building of the complex is such that it presents only obtuse angle direction changes with no abrupt projections which ordinarily define localized air pockets where the exhaust gases from adjacent aircraft may collect, the outline being an open one where exhaust gases or fumes are normally swept away by even slight wind velocities.

Insofar as passenger movements within the building are concerned, the same novel building outline relieves passenger congestion within the building at gate levels in that it enables certain of the most widely used gates to be brought into close proximity with one another to the end that the passenger distances involved in proceeding from one gate to another are not great. Furthermore, the building outline, in combination with certain internal passenger corridors which are associated therewith, maintain the passengers in gate proximity and also afford a passenger group separation or distribution where there is considerably less passenger intermingling than has heretofore been possible with conventional or previously designed airport terminal buildings.

The aforementioned limitations that are attendant upon cargo handling and processing operations with conventional airports are obviated according to the present invention in that both passenger and cargo handling operations are conducted largely within the main terminal building, thus eliminating the need for large acreage freight-handling complexes or buildings at outlying regions, together with their network of freight-transporting roads and rails leading to and from the terminal building. According to the present invention, the only freight-handling facilities which are outside the main terminal building are one or more relatively small freight-receiving transfer buildings to which incoming freight is brought and where it is placed in containers and transmitted in small cargo increments (gondolas) to the terminal building along a single route. At the terminal building, such container-enclosed cargo is computer-programmed and conducted by means of various rails and elevators to predeterminedly assigned gates for loading on the aircraft.

A further limitation that is present in connection with conventional airports resides in the lack of suitable overnight residential accommodations for passengers. Invariably, the presence of a large municipal airport at any given location is attended by the construction of an urban settlement of various hotels, motels, shopping centers within a radius of approximately one mile from the airport terminal building and thus passengers who are obliged to have overnight accommodations find it necessary to leave the airport grounds, seek such accommodations and return to the grounds for airport departure. Passengers frequently meet at an airport for short conferences and, lacking conference facilities, they are obliged to engage remote conference facilities such as a room in a motel or hotel, returning to the airport after the conference is over. The present airport terminal building obviates such situations in that adequate hotel accommodations are afforded within the main or principal terminal building, such accommodations being in the form of a high-rise hotel annex which extends upwardly from the upper deck of the terminal building proper. In addition to such hotel annex, additional terminal building adjuncts are provided and assume positions and proportions which are architecturally pleasing but which, apart from their architectural value, present functional characteristics which are not found in conventional airports.

Among such terminal building adjuncts are a central monument-like structure which extends upwardly from the roof or deck of the terminal building and at the top of which there is disposed a flight tower for personnel and computer equipment. Immediately below the flight tower is a gate tower for personnel and computer equipment by means of which gate assignments and cargo programming are effected. The aforementioned hotel annex is of annular design and encompasses the tower-supporting structure and, in combination therewith, defines a sheltered courtyard for hotel guests. The area of the terminal building roof surrounding the hotel annex may be used for vehicle parking and numerous other commercial facilities such as car rental and golf playing facilities, helicopter landings, etc.

A wide variety of other services and facilities for passengers, aircraft personnel, and airport personnel are afforded by the present airport complex, which provision is made for advantageously suface transportation of passengers by taxicab or limousine within the building confines as well as exteriorly thereof, all in a novel manner that will become apparent as the nature of the airport complex is better understood from a consideration of the following detailed description.

The principal object of the present invention is to provide an integrated industrial and urban airport complex which embodies novel passenger and freight handling facilities as well as the advantages and attributes heretofore mentioned.

Other objects of the invention will be apparent from a consideration of the following detailed description.

The invention consists in the several novel features which are hereinafter set forth and are more particularly defined by the claims at the conclusion hereof.

In the accompanying ten sheets of drawings forming a part of this specification, one illustrative embodiment of the invention is shown.

In these drawings:

FIG. 5 is a further enlarged fragmentary plan view of the ground level of one end region of the main airport terminal building;

FIG. 6 is a fragmentary plan view similar to FIG. 5 but showing the basement or underground cargo storage level of the main airport terminal building;

FIG. 7 is a greatly enlarged fragmentary plan view, largely schematic in its representation, of a limited portion of the main terminal building structure of FIG. 5, this view representing one of a large multiplicity of baggage claiming and exit areas which are associated with the ground level of the main terminal building;

FIG. 8 is an enlarged sectional view taken substantially on the line 8—8 of FIG. 5 and showing incoming and outgoing traffic accommodations, both highway and rail, at both ground and below ground levels for passenger and cargo and within the main airport terminal building;

FIG. 9 is a fragmentary plan view, largely schematic in its representation, of a linear length on the fourth floor level of the enplaning phase of a cargo-handling system which extends in peripheral fashion completely around the main airport terminal building, the system embodying cargo-transporting rails and cargo elevators;

FIG. 10 is a fragmentary plan view similar to FIG. 9 but showing a corresponding section of the interline and intraline phase of the cargo-handling system on the third floor level;

FIG. 11 is a fragmentary plan view similar to FIGS. 9 and 10 but showing a corresponding section of the food-handling phase of the cargo-handling system on the second floor mezzanine level of the main terminal building;

FIG. 12 is a fragmentary plan view similar to FIGS. 9 and 10 and 11 but showing a corresponding length or area of the cargo-handling system on both the ground and below grade building level;

Figure 13:
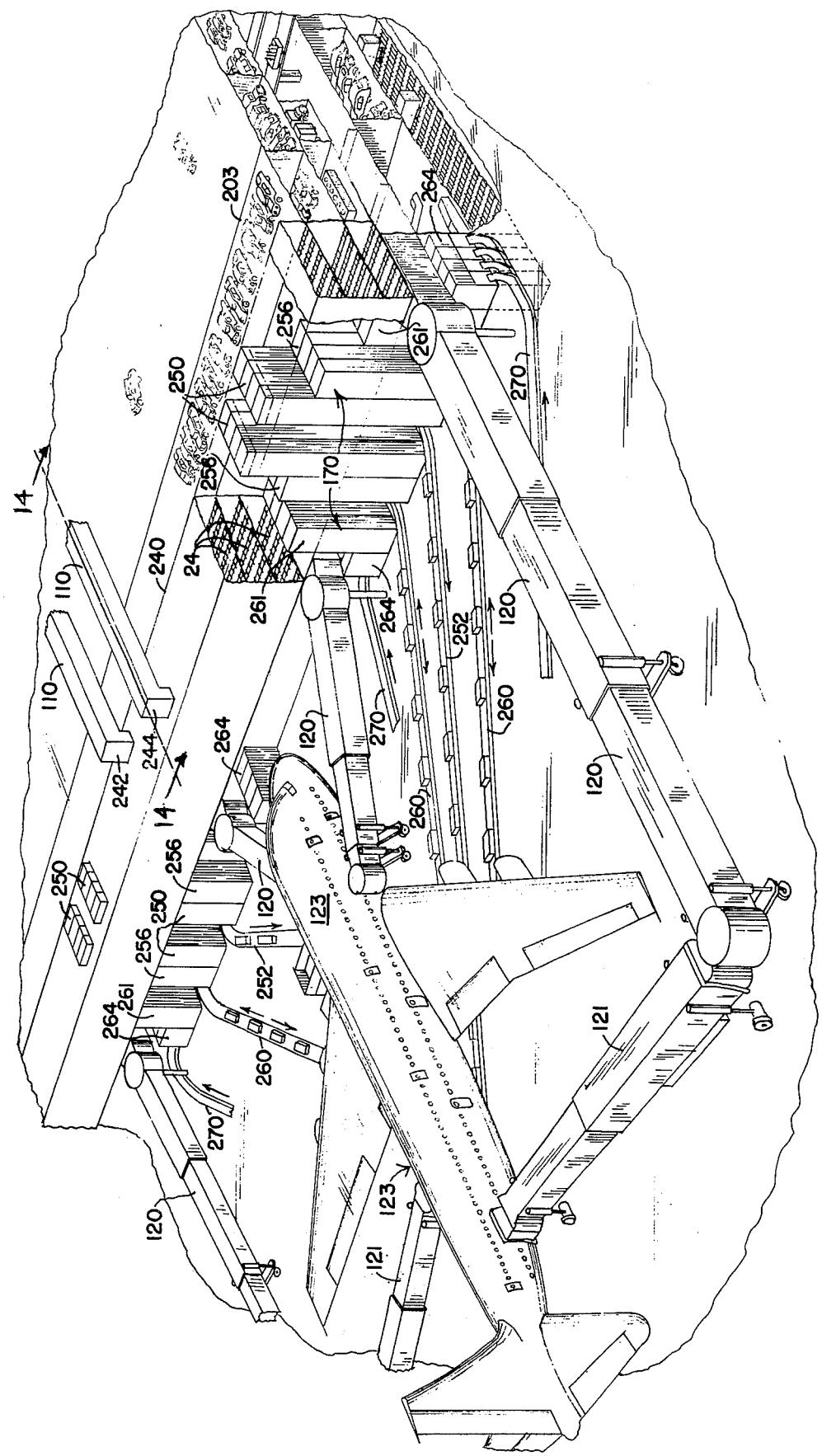
Figure 14:
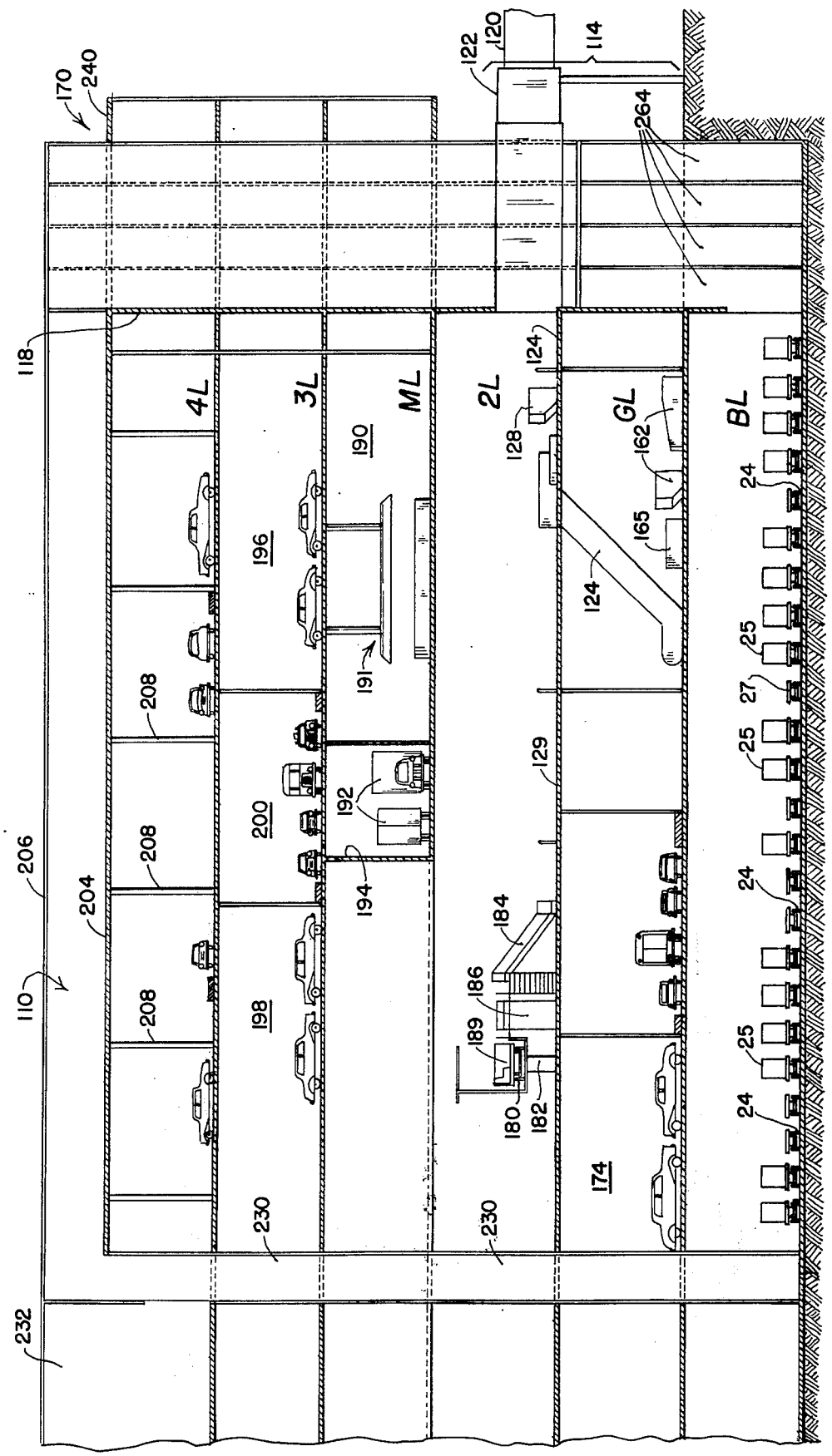
Figure 15:
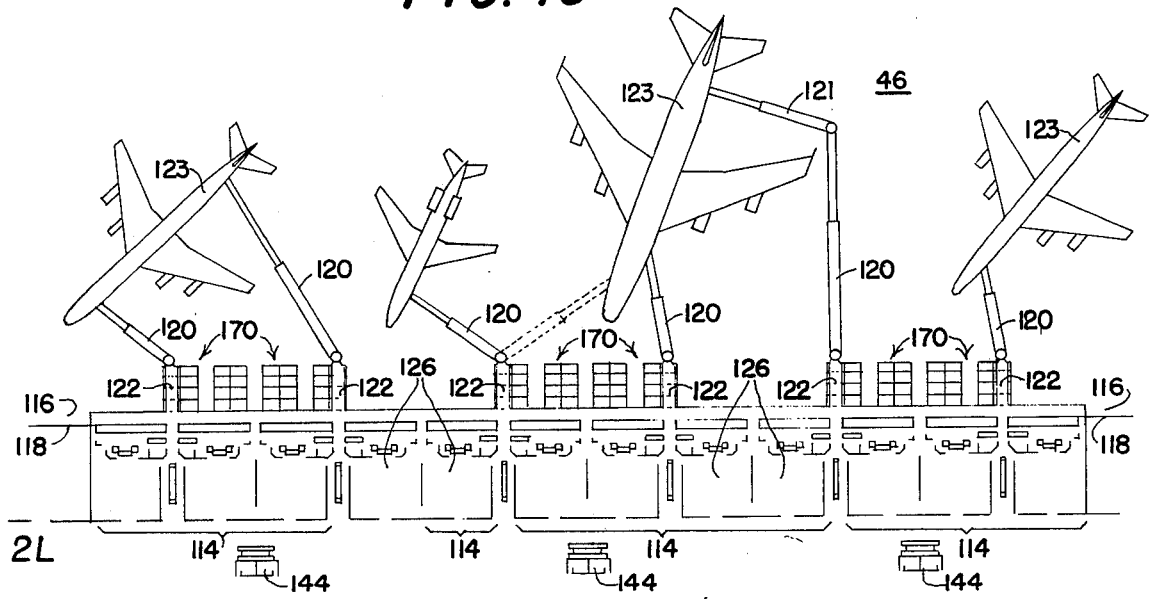
Figure 16:
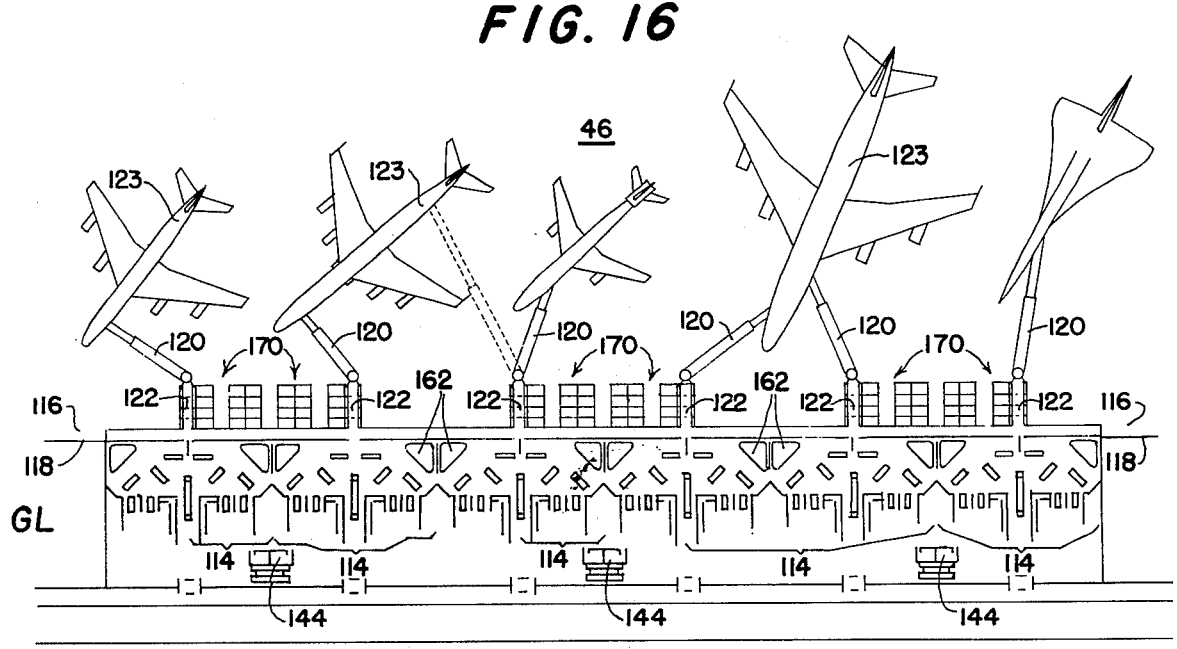
Figure 17:
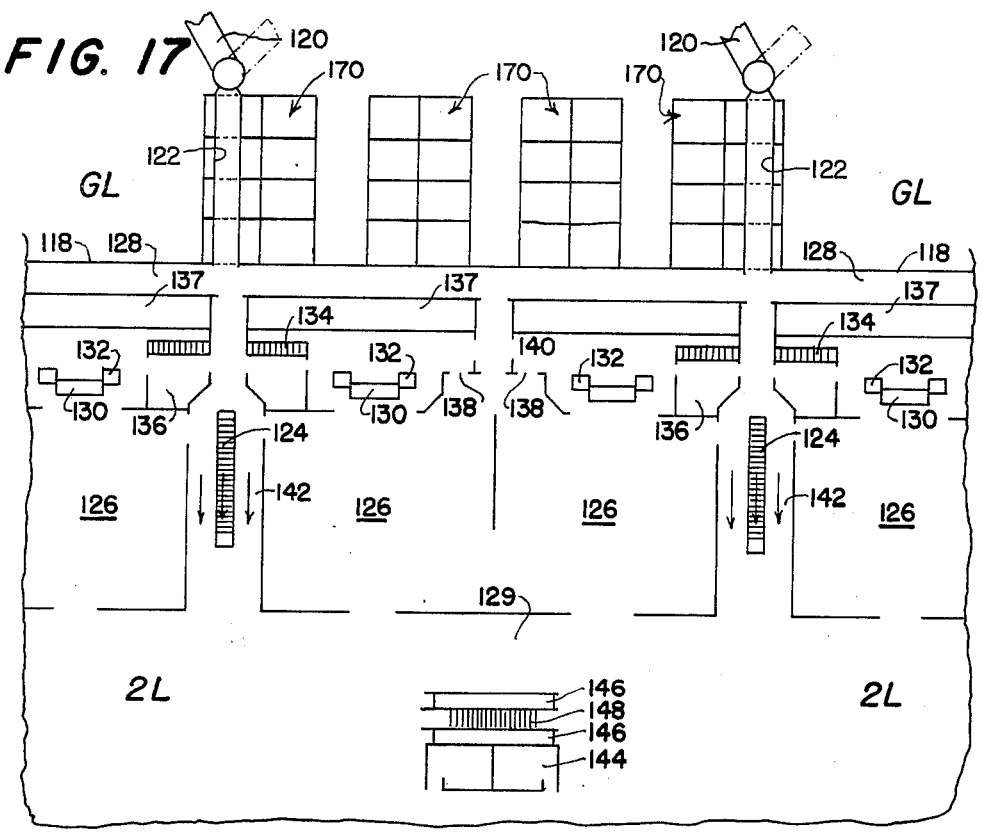
Figure 18:
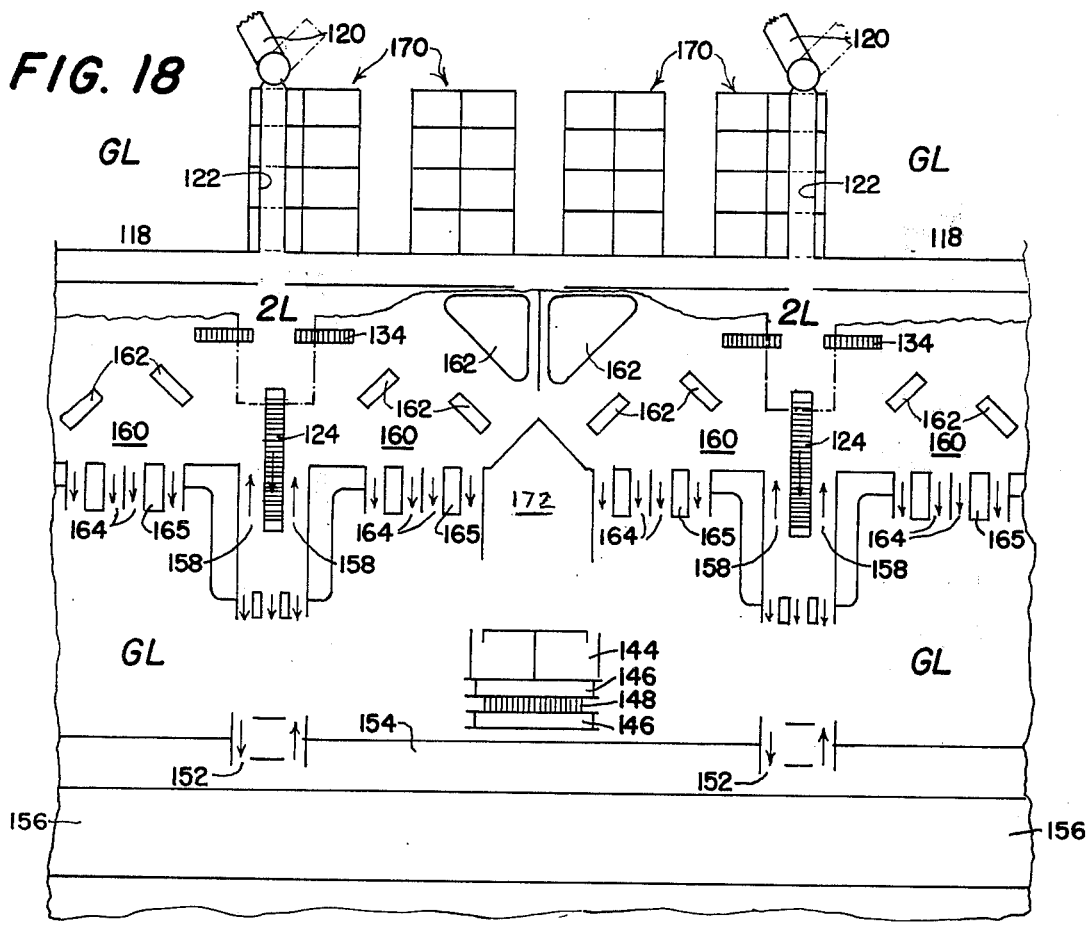

FIG. 13 is a fragmentary perspective view of a portion of the airport complex in the vicinity of several adjacent aircraft loading and unloading gates which are associated with the main terminal building, showing an aircraft in position thereat and operatively connected to or associated with such gates by appropriate passenger bridges including a self-propelled mobile passenger bridge, and cargo carrying conveyors, a portion of the adjacent terminal building being broken away in the interests of clarity in order more clearly to reveal the nature of the passenger and cargo facilities and conveniences within and surrounding the building;

FIG. 14 is an enlarged vertical sectional view taken substantially on the vertical plane indicated by the line 14—14 in FIG. 13 and in the direction of the arrows;

FIG. 15 is a fragmentary plan view of a limited region of the aircraft arrival and departure ramp which surrounds the main terminal building, the view embodying several adjacent aircraft-accommodating passenger gates, passenger bridges between the aircraft and the gates, and second floor level passenger accommodations within the building;

FIG. 16 is a fragmentary plan view similar to FIG. 15 but showing ground level passenger accommodations and the manner in which the aircraft are accommodated during passenger deplaning operations;

FIG. 17 is an enlarged fragmentary plan view similar to FIG. 15 but showing in greater detail the second floor passenger enplaning accommodations;

FIG. 18 is an enlarged fragmentary plan view similar to FIG. 16 but showing in greater detail the first floor passenger deplaning accommodations;

FIGS. 19, 20, 21 and 22 are fragmentary views, entirely schematic in their representation, showing the peripheral cargo handling rail system within the main terminal building of the airport complex, the nature of the various tracks at each of several floor levels, and the association of such tracks with their respective cargo elevators; and FIG. 23 is a fragmentary schematic plan view of one of two third-floor level interline and online cargo-holding areas which are associated with and form separate pairs of the airport complex.

Figures 1, 1A:
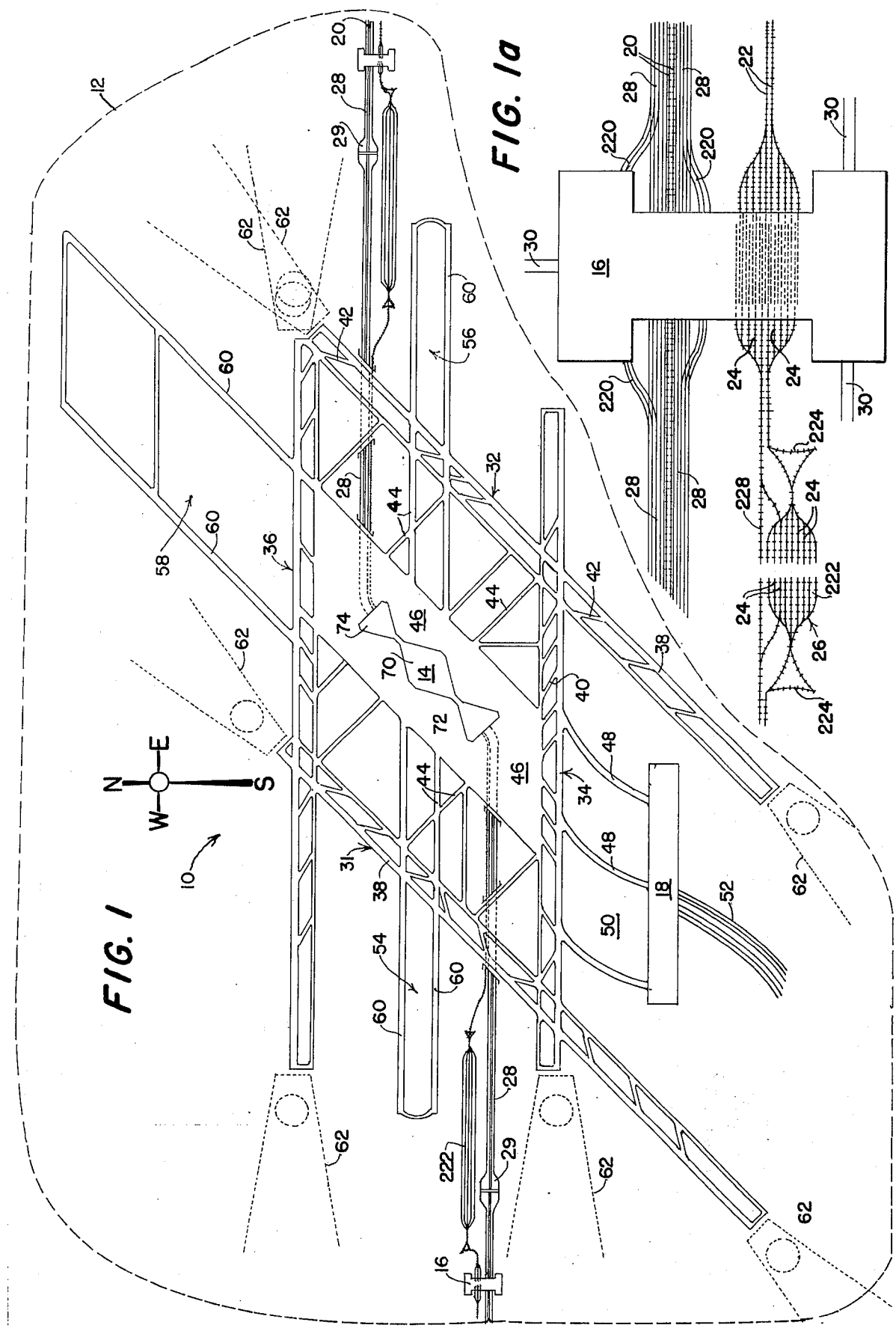
FIG. 1 is a surface layout of an airport installation or complex embodying the principles of the present invention.
FIG. 1a is an enlarged fragmentary view of a limited portion of the surface layout of FIG. 1, the view representing one of a pair of passenger and cargo entrance zones embodying both rail and highway traffic.

Referring now to the drawings in detail and in particular to FIGS. 1 and 1a, there is disclosed in these views a major airport installation or complex 10 which is located upon a land tract 12 as is shown in outline by dotted lines. The dimensions of the land tract may vary within wide limits but for purposes of orientation and of leading size comparisons to the various runways, buildings, and other component parts of the installations or complex, the length of the tract 12 is stated to be on the order of 10 miles. Although the illustration is based upon such a length dimension in order to emphasize runway, building and other dimensions, it will be distinctly understood that the actual dimensions which are employed may vary according to the service for which the airport is intended and according to the population size of the particular manicipality which the airport is intended to serve. The present illustration of the airport complex is intended to accommodate one of the ten largest cities of the United States of America although appropriate modifications of the complex are contemplated in order that it may serve smaller municipalities, such modifications consisting largely of either size reductions or component eliminations.

As will be described in greater detail subsequently, the airport complex 10 consists, in the main, of a plurality of buildings, a mass transit railway system for passengers and freight coming to and leaving the complex, a highway or expressway and road system for vehicular traffic entering and leaving the airport, a system of packaged freight-transporting rails, and a system of runways or airstrips, the surface layout of such buildings and systems being shown in FIG. 1. Insofar as the airport buildings are concerned, these include a main centrally located terminal building 14, an outlying freight building 16 at each end of the airport, and an outlying building 18 for the distribution and handling of interline and online heavy freight such as incoming or outgoing machinery or the like. It is contemplated that numerous other lesser buildings (not shown herein) such as a post office building, a machine shop or maintenance building or the like may be located at various outlying regions of the airport complex, although the facilities served by such buildings may be embodied in the aforementioned main terminal building 14 if desired.

In conventional airports, air freight terminal buildings are disposed at a great distance from the main terminal building and it is necessary either to truck great quantities of freight and cargo from these outlying buildings to the passenger loading ramp and put them on the aircraft. According to the present invention, the cargo is brought in from the freight terminals by computerized programming, conducted by rails to the main terminal building, and distributed by additional computerized programming and cargo handling apparatus to the various enplaning aircraft on the ramp. Deplaning cargo is handled in a reverse manner.

As will become more readily apparent as the nature of the airport complex is better understood, the railway system includes two parallel tracks 20 (see FIGS. 1 and 1a) for incoming and outgoing mass passenger transit cars at one end of the airport, and for output railway cars at the other end of the airport, these tracks extending completely through the airport and passing longitudinally through the main terminal building 14. It will be understood that the system of dual tracks is schematically shown by two parallel lines in FIG. 1 due to small-scale space limitation, but in reality each track will consist of two conventional or standard rails. The railway system further includes two similarly parallel tracks 22 at each end of the airport, such tracks leading to and from the outlying freight transfer building 16 and terminating at such building.

The packaged freight transporting system includes a multiplicity of gondola-supporting tracks 24 which extend inwardly of the airport from the freight transfer building 16 and lead to the terminal building 14 where they communicate with various other gondola-supporting tracks throughout the building for cargo handling purposes that will be made clear presently. In the following description and throughout this specification as well as in the drawings, passenger rail tracks will be designated by the reference numeral 20 while cargo-transporting tracks will be designated by the reference numeral 24, although certain special track areas such as transfer areas, holding or storage areas and the like will be given collective designations. The cargo which is transported on the tracks 24 may be of a varied character, but in the main and as customary in connection with conventional airports, much of this cargo is packaged in individual containers known as "gondolas"

and, therefore, the vehicles which are intended to run on such tracks 24 are referred to herein as gondola cars, the actual cars and gondolas being omitted in FIGS. 1 and 1a of the drawings in the interests of clarity. However, such gondolas are designated by the reference numeral 25 in FIG. 14 and elsewhere in the drawings and the cars which support them are designated by the reference numeral 27. The gondolas 25 are consignee-filled at various track locations, for example, at the transfer building 16, and are subsequently transported and handled variously according to their destinations and are ultimately shipped on departing aircraft.

The tracks 24 which lead from the freight transfer building 16 communicate with a gondola holding area 26 where the gondola cars 27 may be variously switched from track to track according to gondola destinations.

Still referring to FIGS. 1 and 1a of the drawings, the highway and road system which is associated with the airport complex 10 includes two multi-lane expressways 28, one on each side of the rails 20. Both the rails 20 and the expressways pass longitudinally through the terminal building 14 for passenger loading and unloading operations in a manner that will become clear when the nature of the building 14 is set forth. Both expressways pass through a toll plaza 29 at each end of the airport 10. A series of three roads 30 communicates with the freight transfer building 16 for cargo transportation purposes.

The runway system of the airport 10 may be similar to that which is disclosed in United States Patent No. 3,558,085, granted to me on Jan. 26, 1971, and entitled AIRPORT SURFACE LAYOUT, but with slight modifications. Such system per se constitutes no part of the present invention, but its disposition with respect to the railway and highway systems. together with the provision of certain taxiways affords novel and useful aspects of the airport complex as a whole which will be pointed out hereinafter.

The herein disclosed runway system preserves the intersecting arrangement of airstrips which is shown in aforementioned Pat. No. 3,558,085, the four airstrips herein being designated by the reference numerals 31, 32, 34, 36. However, each airstrip is of a dual nature and embodies a relatively wide runway 38 of adequate width to meet the requirements of the largest aircraft intended to be accommodated, and also a relatively narrow taxiway 40 of each airstrip. A network of taxiways 44 leads inwardly from the four airstrips 31, 32, 34 and 36 and communicates with a terminal concrete ramp area 46 which surrounds the main terminal building 14. Additional taxiways 48 lead from the runway 38 of the airstrip 34 to a ramp area 50 adjacent to the inner side of the machinery-processing building 18. A road 52 communicates with the outer side of the building 18. To facilitate further reference to the runway system as well as to other areas of the land tract 12, a weather vane type directional indicia appears in the layout of FIG. 1. Such indicia are, however, only exemplary and it will be understood that the orientation in the airstrips will be determined by such factors as the geographical location of the airport complex and the prevailing winds at such location. The various airstrips 31, 32, 34 and 36 are useable either as arrival or departure airstrips, but preferably, and in accordance with the runway system of said Pat. No. 3,558,085, all of these airstrips are employed as arrival airstrips and aircraft departures are effected by using a series of three central radially extending airstrips 54, 56 and 58, each of which contains twin runways 60, the airstrip 58 being considerably wider than the airstrips 54 and 56. Illuminated approach patterns 62 may be provided at the outer ends of the various landing airstrips 31, 32, 34 and 36. It will also be understood that various standardized runway and taxiway lighting systems and runway surface markings, threshold markings and the like (not shown) may be provided. For a more complete understanding of the advantages of the arrangement of the various airstrips 31, 32, 34 and 36 which are employed in the present airport complex, reference may be had to any aforementioned Pat. No. 3,558,085, it being deemed sufficient to point out herein that the arrangement affords what may be termed a "flow through" aircraft arrival system wherein a unidirectional flow of arriving and departing aircraft is attained.

Figure 2:
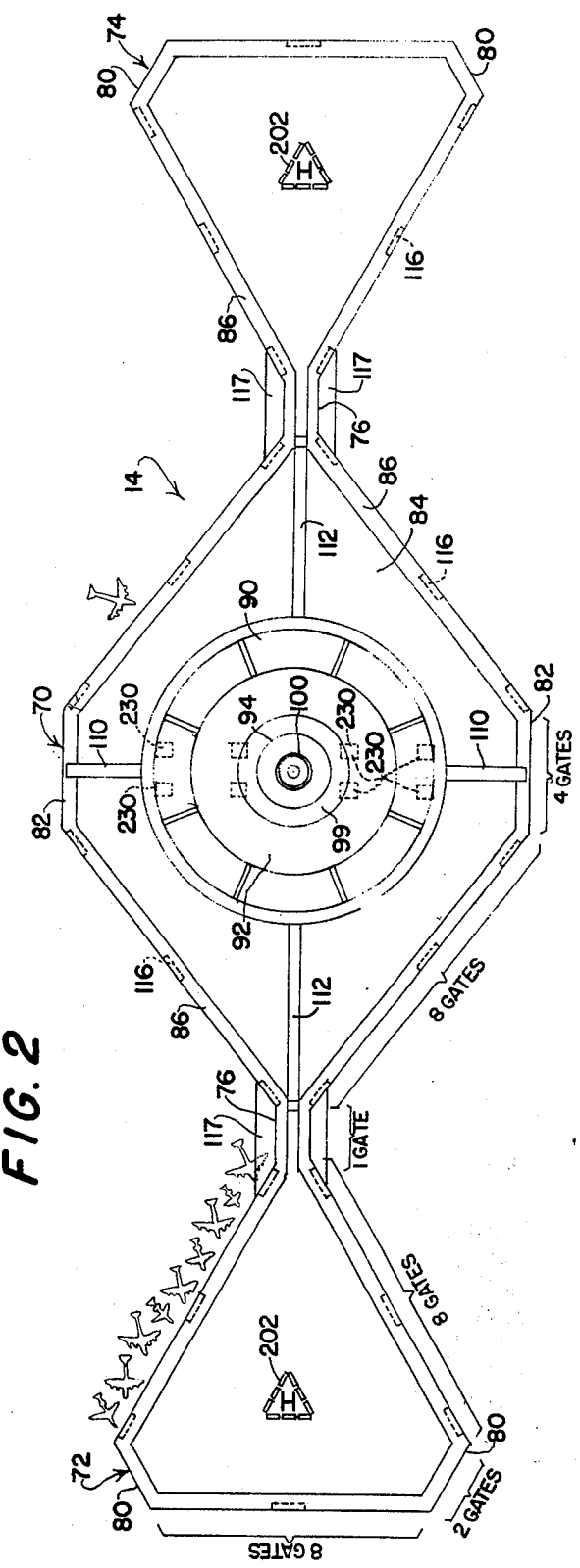
FIG. 2 is an enlarged plan view of the central portion of the airport complex, that is, the portion which embodies the main airport terminal building.
Figure 3:
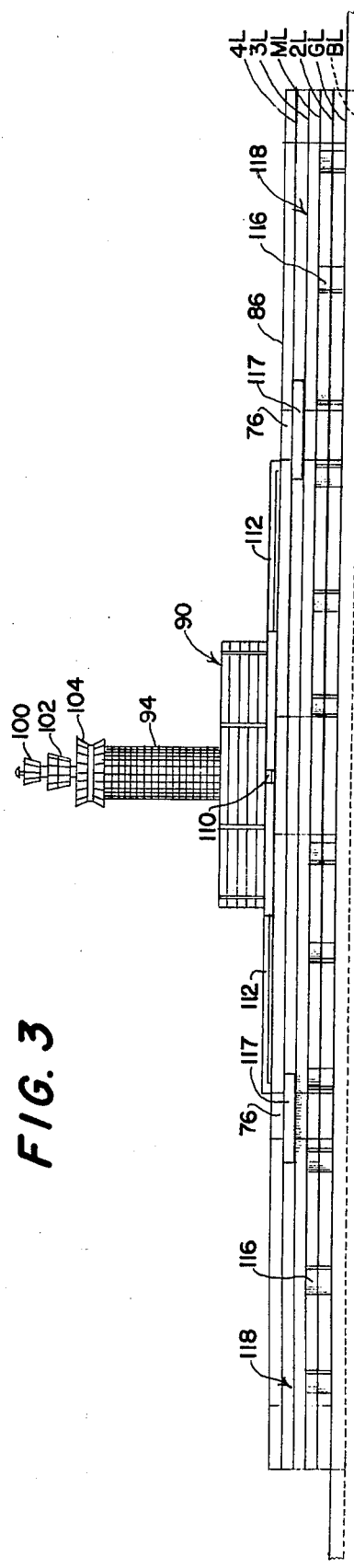
FIG. 3 is a side elevational view of the main airport terminal building of FIG. 2.
Figure 4:
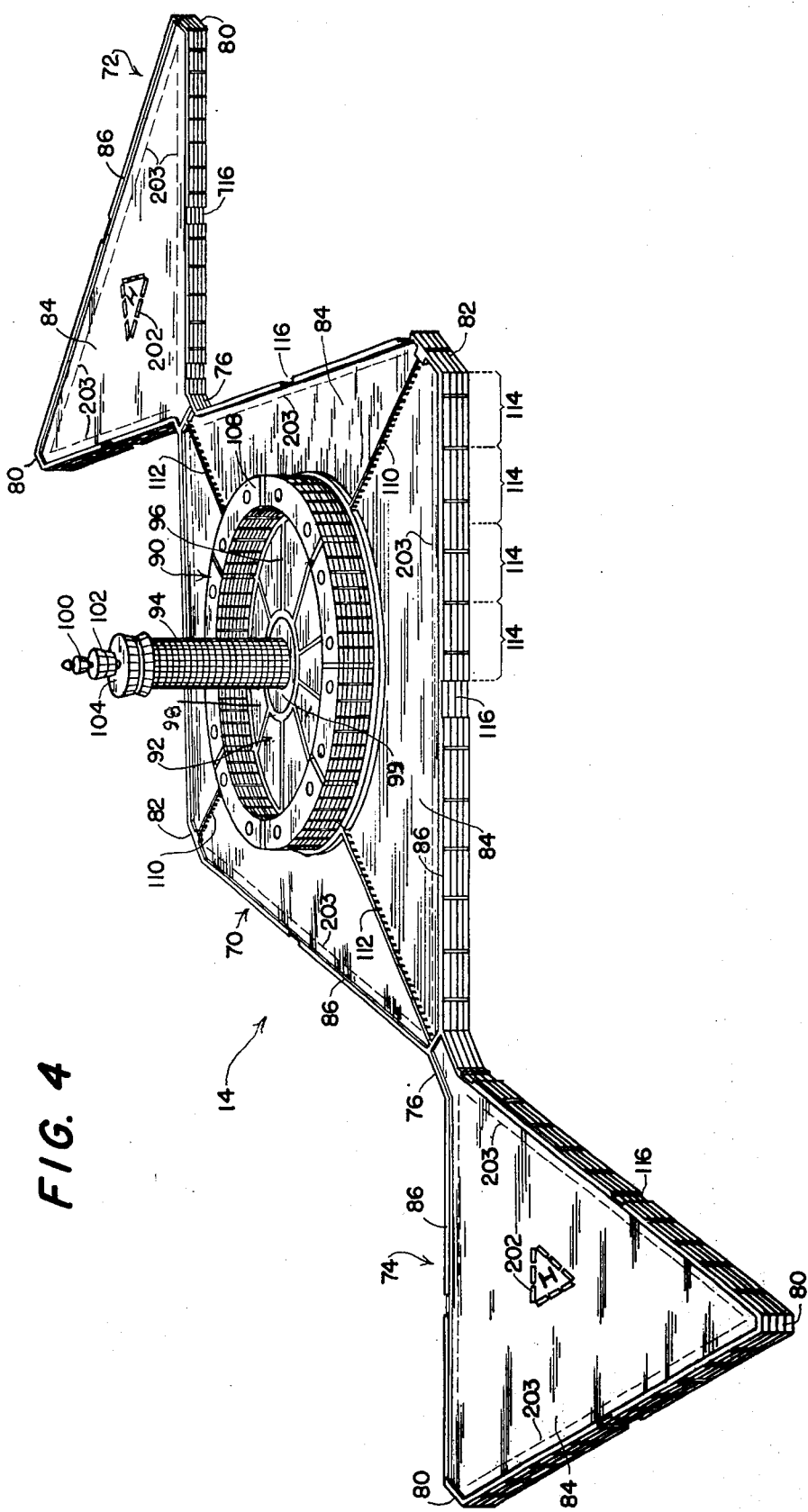
FIG. 4 is a perspective view of the main airport terminal building.

Referring now to FIGS. 2, 3 and 4 of the drawings wherein the main terminal building 14, insofar as its shape characteristics are concerned, is clearly illustrated, this building, together with its various passenger and freight loading gates and the facilities which it offers for mass passenger and cargo movements as well as for passenger conveniences, constitutes the principal feature of the present invention.

Considering first the building exterior and particularly its outline, the main terminal building 14 is comprised of a central section 70 (see FIGS. 2 and 3) having an outline which approximates that of a parallalogram, and a pair of end or wing sections 72 and 74 each of which has an outline which approximates that of a triangle. With reference to the directional indicia of FIG. 1, the wing section 72 constitutes and will hereinafter be referred to as the northeast wing, while the wing section 74 constitutes and will hereinafter be referred to as the southwest wing. The central section 70 is roughly speaking diamond-shaped, while the wing sections 72 and 74 are generally triangular with truncated outer corners. Considering the three sections as a whole, a plan view thereof presents an outline which is generally in the shape of a "bow tie." As will be set forth in greater detail subsequently, this bow tie configuration of the main terminal building outline presents many advantages among which are the inhibition of air pollution in the vicinity of the main terminal building due to the absence of predominant building projections and pocket-like depressions which ordinarily capture gaseous emissions from the adjacent aircraft, the avoidance of passenger congestion within the interior so that right-angle corners within the building do not conceal passenger destinations, and improved maneuverability of aircarft of the loading ramps where wide angle access to the various loading gates is available.

The multi-story main terminal building 14 of the airport complex 10 is comprised of six levels (see FIG. 14) and these include a below grade level or basement which is designated in the drawings by the representation BL, a ground or first floor level GL, a second floor level 2L, a third floor level 3L, a fourth floor level 4L and a second floor mezzanine level ML, all of such levels being continuous throughout the entire building 14 including the central section 70 and both wings 72 and 74. The mezzanine level ML is in the form of a peripheral balcony which extends around the building on all sides thereof and which presents continuous floor areas in the narrow neck portions 76 by means of which the northwest and southwest wing sections 72 and 74 are joined to the central section 70.

The outer corners of the generally triangular wing sections 72 and 74 of the main terminal building 14 are provided with linearly straight truncated corner regions 80 and the outer corners of the central section of the building 14 are similarly provided with linearly straight truncated corner regions 82.

The main terminal building 14 of the airport complex 10 is provided with a substantially continuous horizontal upper deck 84 (see FIG. 4) which, in effect, affords a roof for the building, such roof assuming the generally bow tie shape in outline and being provided with an upstanding protective marginal wall 86, the latter extending substantially continuously around the periphery of the deck. In the central building section 70, the deck 84 is discontinued so as to provide a circular void within which there is erected a generally circular or annular inhabitable multi-story building complex 90, the building complex defining an inside sheltered area or courtyard 92 from the central region of which there projects upwardly a generally cylindrical tower structure 94 which also is inhabitable.

The specific architectural features of the central building section 70, its associated multi-story building complex 90, and the tower structure 94 have not been disclosed herein, but it will be understood that such structures will be constructed on sound architectural principles, both the complex 90 and the tower structure 94 being suitably supported and reinforced by support columns, pylons or the like which extend vertically through the building 14 and are anchored deep within the ground. The aforementioned circular sheltered area 92 establishes a courtyard which may be provided with any desired pattern of walks 96, with intervening garden or other areas 98, and with a circular lake 99 which surrounds the tower structure 94. The tower structure 94 may constitute an administration and office building and the extreme upper end thereof may be used as a gate control tower 100 where computerized equipment and a computer staff may attend to gate assignments for incoming and outgoing planes in the usual manner of such gate operations. Among the computerized operations which may be performed in the gate tower are the assignment of passenger bridges to the various incoming aircraft. Such passenger bridge assignments may take place, for example, when the aircraft of competitive airlines occupy adjacent positions on the ramp and one aircraft has need for extended facilities not required by the other aircraft. Under such circumstances, interline sharing of facilities may take place. When such sharing of the passenger bridges occurs, the hereinafter mentioned service corridor 128, which is common to all hereinafter mentioned gates 114, facilitates personnel movement between the adjacent gate areas for enplaning and deplaning of passengers. Immediately below the gate control tower 100 is a flight control tower 102 with suitable computer equipment, and below such latter tower is a sky restaurant 104. The portion of the tower structure 94 below the restaurant 104 may contain offices or the like. A pair of transverse radially extending elevated dual-track shuttle bridges 110 extends from the building complex 90 to the truncated corner regions 82 of the central section 90, while a similar pair of shuttle bridges 112 extends from said building complex 90 to the narrow neck portions 76 and serve a function that will be made clear subsequently.

As is customary in connection with conventional airport terminal buildings, a series of gates are disposed in peripheral fashion around the entire main terminal building 14 of the airport complex 10. These gates consist of peripheral extents or areas which have been designated by bracketed reference numerals 114 in FIGS. 2 and 4 and elsewhere in the drawings. In the illustrated form of building 14, one hundred such gates are disclosed although a greater or lesser number thereof may be employed if desired. The building 14 is symmetrical both longitudinally and transversely and, therefore, the numerical legends which appear in FIG. 2, when totalled, account for the stated one hundred gates. At spaced points around the main terminal building 14 are ramp service access entrances 116. Third floor overhanging balconies (see FIGS. 2 and 3) are provided on both sides of the building 14 in the vicinity of the narrow neck portions 76.

Considering now the aforementioned gates 114, the use of the term "gate" herein is not used in the sense of either an entrance or an exit passage, but rather it is used in the conventional airport sense in that it refers to a second floor check-in or enplaning area or region where passengers gather immediately before departure from the terminal building for the purpose of boarding a particular aircraft, and also to a ground level area where passengers enter the terminal building upon deplaning. Such gates or areas are usually attended by check-in personnel such as security baggage checkers, ticket inspectors, guards and the like, and the gates also function as terminal or final waiting areas for plane arrivals and departures. The various gates or passenger gathering areas 114 are disposed largely within the building confines as shown in FIGS. 15 to 18, inclusive, and they include floor areas in the vicinity of the outer building wall 118 and also limited areas just outside such wall and on the aircraft ramp 84.

As previously stated, the peripheral location of the various gates 114 is indicated by brackets in FIG. 2 and elsewhere, there being eight such gates along each of the three major sides of both triangular wing sections 72, eight gates along each of the four major sides of the central section 70, two gates along each of the minor truncated corner regions of the wing sections 72, four gates along each of the outermost sides of the central section 70, and one gate along each side of the two narrow neck portions 76, the total number of gates thus being one hundred as heretofore indicated. These gates may vary in number, size and disposition, as well as in their passenger conveniences and, in general, the passenger conveniences thereof are disposed on the second floor level 2L and the ground floor level GL as shown in FIGS. 15, 16, 17 and 18.

Bearing in mine that passenger enplaning facilities are disposed largely on the second floor level 2L as shown in FIGS. 15 and 17 of the drawings, and that passenger deplaning facilities are disposed largely on the ground floor level GL as shown in FIGS. 16 and 18, both enplaning and deplaning passengers enter and leave a given aircraft by means of conventional swinging telescopic passenger bridges 120 which extend between the parked aircraft to short covered passages 122 by means of which the passengers may enter upon or leave the second floor level. The gates are so arranged that deplaning passengers, after entering the building at second floor level, may then descend by means of escalators 124 to the ground floor level GL as shown in FIGS. 17 and 18 where such deplaning activities as may be found necessary are carried out. On the other hand, enplaning passengers who have arrived at their respective gates, remain on the second floor level 2L in the gate area until departure time, and then proceed to their aircraft successively through the passenger bridges 122 and 120.

The various passenger bridges 120 which are disclosed herein are purely conventional and a wide variety of such bridges are available for use in establishing passenger communication between the doorway exits and entrances (not shown) leading from the terminal building at the various gate locations. These passenger bridges constitute no part of the present invention and no claim is made herein to any novelty associated with the same. In addition to the passenger bridges 120, a pair of self-propelled and completely mobile passenger bridges 121 is shown in FIG. 13 as being connected to the distal end of a conventional passenger bridge 120 for movement of passengers into the rear or behind-the-wing doorway of an aircraft 123. A mobile passenger bridge 121 like the two illustrated bridges constitutes the subject matter of my copending United States patent application Ser. No. 284,229, filed on Aug. 28, 1972, and entitled SELF-CONTAINED MOBILE PASSENGER BRIDGE FOR AIRPLANE LOADING AND UNLOADING OPERATIONS. Such a mobile passenger bridge constitutes a useful component of the present airport passenger handling system and it has, therefore, been disclosed herein only for illustrative purposes.

The passenger enplaning facilities at each gate and on the second floor level 2L are shown in FIG. 17 and include one or more passenger holding or waiting areas 126 which on their outer sides communicate with a general passenger and service corridor 128 and on their inner sides communicate with a main corridor 129 leading to the building lobby. Within the holding area is a flight check-in and ticket issuing desk 130 with associated baggage scales 132. Other facilities at each gate are service stairs 134 leading to the ground floor level GL, flight crew seating areas 136, enplaning baggage containers 137, turnstyle exits 138 for passengers, a hallway 140 leading to the corridor 128, and one-way passages 142 for deplaning passengers who elect to proceed directly to the building lobby and have no need to descend to the ground floor level of the gate. Also provided on the second floor level 2L in the vicinity of certain of the gates are suitable lavatories 144, up and down escalators 146 leading to the ground floor and third floor levels respectively, and accompanying stairways 148. It is contemplated that an enplaning passenger will approach the ticket issuing desk 130, obtain his or her ticket after presenting his credentials, then proceed past the desk 130 to the adjacent baggage container 137 where he will deposit his checked-in baggage. Thereafter, the passenger will pass through the one-way turnstyle exit 138 and enter the seating area 126 for the purpose of awaiting plane departure.

The passenger deplaning facilities at each gate and on the ground floor level GL are shown in FIG. 18. Passengers leaving a given aircraft by means of a passenger bridge 122 will proceed through the associated passage 122 and hallway 124 to the ground level GL where they may, if devoid of baggage, pass through one-way doors 150 and 152 leading to a sidewalk and curbing 154 within the building 14 and adjacent to a traffic lane 156 for taxicabs, limousines, automobiles, etc. A passenger with baggage to be claimed may leave the escalator 124 and pass through one-way doors 158 to a baggage claiming area 160 having baggage racks, carousels and the like 162 associated therewith. After baggage claiming operations are complete, the passenger may exit through one-way passages 164 and doors 152. Baggage checker's desks 165 may also be provided at the ground floor level GL and the aforementioned escalators 146 and stairs 148 are available for the passenger if he elects to proceed up to the second floor level 2L. Lavatories 166 may also be provided on the ground floor level of the main terminal building 14.

It is to be noted at this point that at each of the various gates 114 and as shown in FIGS. 15 to 18, inclusive, a series of cargo elevators 170 is provided immediately adjacent to the building line or wall 118. The nature and function of these elevators will be set forth in detail presently when cargo-handling facilities for the main terminal building 14 of the airport complex 10 are described.

Continuing with a discussion of passenger handling and convenience facilities, of which the various gates 114 constitute a major part, these gates may vary in size or area and occupy linear extents along the perimeter of the building 14 but are preferably commensurate with the size of the aircraft which they are intended to accommodate but which are adaptable to aircraft of any size. The plan or layout disclosures thereof in FIGS. 15 to 18, inclusive, are merely exemplary of a preferred form of gate and it will be understood that the exact arrangement of passenger flow corridors, exits and entrances to and from the holding areas 126, as well as of the baggage retaining and flight processing facilities may be varied according to the flight passenger demand. Furthermore, the disclosures of FIGS. 15 to 18, inclusive, are only schematic portrayals of which only a few physical representations are made in FIG. 14. However, one novel and important feature of the various gate areas 114 resides in the provision of aforementioned both outside and inside enplaning and deplaning passenger corridors 128 and 129 both of which extend in peripheral fashion around the building 14 and by means of which passenger congestion in the main corridors leading to the various gates, as is prevalent in connection with conventional airports, is alleviated.

As previously indicated, the disclosure of FIG. 17 of the drawings represents a schematic illustration of the second floor level gate arrangement along only a limited peripheral region of the building 14, the illustration involving approximately two enplaning gates. It will be understood that such gate arrangements are substantially continuous around the entire perimeter of the building. These gate areas, considered collectively, encompass a large central area or floor space on the second floor level 2L. This floor space may be employed to accommodate various airline and other commercial services and facilities as, for example, passenger lobbies, information desks, ticket processing counters, first air dispensaries, administration offices and the like. Private commercial enterprises such as various shops, restaurants, cafes, lunch counters, bars and lounges, drugstores, insurance offices or stands, lock boxes, automatic dispensing machines for cigarettes, candy and the like, and a wide variety of other facilities commonly available to airport passengers at modern airports may be situated in this large central second floor level area according to any desired floor plan.

At the below ground or basement level BL is a series of the aforementioned gondola-supporting rails or tracks 24 (see FIG. 14), variously distributed throughout such level. The gondolas 25 and the gondola cars 27 are held for selective distribution by computerized programming.

On the ground level GL, in addition to the previously described baggage-claiming gate arrangements 114, the curbing 154 and the traffic lane 156 for exiting vehicles, there may be provided a passenger greeting area 172. On the side of the traffic lane 156 remote from the gate area 114 are parking facilities 174 for the vehicles of deplaning passengers. A major portion of the ground level GL is taken up by these parking facilities.

Another feature of the passenger-handling system within the main terminal building 14 resides in the provision of an elevated passenger-carrying transport or shuttle which extends completely around the peripheral region of the building on the second floor level 2L thereof, just inwardly of the main passenger corridor 129 (see FIG. 14), and it is comprised of an elevated track 180 which is supported on columns 182. In the vicinity of each gate 114, an escalator 184 lead upwardly from the floor of the second level 2L to a boarding platform 186, while stairs 188 lead downwardly from the platform. A plurality of passenger cars 189 travel on the track 180 and move unidirectionally therealong. The passenger cars are computer-programmed to make a brief stop at each platform 186 for the purpose of receiving or discharging passengers. In the illustrated form of this system, although the various passenger cars 190 travel unidirectionally on the track 180, if desired, a pair of tracks may be provided for two-way travel thereof. By such an arrangement, by boarding this system at any given gate 114, a passenger may proceed to any other gate in the system of gates. It is contemplated that the elevated passenger-moving system shall travel in a generally rectangular path around the peripheral region of the central section 70 of the building 14, but if desired, the system may be extended to enter into and transverse the peripheral triangular wing sections 72 and 74.

Still referring to FIG. 14 of the drawings, the aforementioned mezzanine level ML which is of balcony-like design may extend continuously around the peripheral region of the building 14 including both the main and wing sections thereof, or alternatively only around the periphery of the central section as desired. This mezzanine level is designed largely for the preparation of food trays for flight means and at appropriate regions therearound, there may be provided a series of flight kitchens 190 including the usual kitchen equipment such as stoves 191, refrigerators, or the like, together with food preparations tables, dishwashing equipment, food machinery and kitchen office facilities, etc. (not shown). Food transportation is provided for by means of food trucks 192 which travel in a corridor 194. Other food handling apparatus by means of which prepared food may be distributed to various gates 114 and from thence to deplaning aircraft, and by means of which leftover food supplies may be returned to the kitchens will be described subsequently.

The third floor level 3L is devoted mainly to parking facilities and it includes a parking area 196 for vehicles whose passengers are inflight, a parking area 198 for vehicles whose passengers have arrived to meet incoming planes. A traffic lens 200 for incoming vehicles serves both parking areas 196 and 198.

The exposed portion of the fourth floor or roof level 4L of the main terminal building 14, including both the central section 70 and the two wing sections 72 and 74, may be devoted almost entirely to parking facilities. The unexposed annular area of this fourth floor level which underlies the annular multi-story building complex constitutes a cargo distribution area, a portion of which appears in FIG. 14, and the nature and function of which will be set forth presently. It will be understood that appropriate parking lenses which are suitably marked for identification, will be provided on the exposed parking areas of the deck 84 which establishes this fourth floor level or roof. Each wing section of the main terminal building 14 is provided with a centrally located heliport 202 for the landing and departure of helicopters, while the peripheral area of such wing sections may be devoted to car rental facilities.

It should be borne in mind that FIG. 14 of the drawings is a sectional view which is taken on FIG. 13 with the section line passing longitudinally and vertically through one of the aforementioned four narrow radically extending shuttle bridges 110 for enplaning cargo only, such shuttle bridge appearing above the roof of deck 84. The floor and roof of the shuttle bridge 110 are designated by the reference numerals 204 and 206, respectively, the floor being supported from the deck by means of appropriately spaced pillars or stanchions 208. As will be described in greater detail subsequently, the inner and outer ends of each shuttle bridge 110 communicate with various cargo elevators.

Considering now tht cargo-handling facilities which are available at the airport complex 10, cargo may be delivered to either of the two outlying freight transfer buildings 16 at the opposite ends of the airport. Since both the buildings 16 serve substantially the same purposes and functions, a description of cargo deliveries and handling in the east building 16 of FIGS. 1 and 1a will suffice for the cargo activities which take place at both buildings. Cargo may be received at the building 16 in freight cars arriving on the tracks 22. Alternatively, freight may arrive in trucks which deviate from the expressways 28 so as to enter the building 16 through exit lanes 220 which lead to the building. Also cargo may enter the building 16 through any of the roads 30. Within the building 16, the cargo is unloaded and placed in containers or gondolas 25 which are then transported on gondola cars 27 on the tracks 24 to a holding area 222 having back-up switching facilities 224 which are associated therewith and by which the various gondola cars may be switched and dispatched in any predetermined sequential order over a line 226 (see FIGS. 1a and 16) leading to the northeast wing section 72 of the main terminal building 14. A return line 228 leads from the wing section 72 back to the building 16 for the return of empty gondola cars.

Referring now to FIG. 6 of the drawings, the cargo which enters the northeast wing 72 of the main terminal building 14 is received at the below grade or basement level BL (see FIG. 14) where a large multiplicity of the tracks 24 which are substantially coextensive with the entire floor area of the building constitutes a large holding and transfer area of such cargo. The specific layout of the tracks 24 in this below grade holding area may vary widely, but in the illustrated track of FIG. 6 the track arrangement is such that cargo entering the northeast wing section 72 may proceed by various routes, either around the periphery or through the building and enter both the central section 70 and the southwest wing 74 so as to proceed to various selected standby areas, all or at least a large proportion of such cargo consisting of enplaning cargo and being dispatched by computerized programming which takes place in the aforementioned gate tower 100. As will be set forth in detail hereafter, the net result of such programming of enplaning cargo at the below grade level BL is to assign the various gondolas to the proper gates 114 for subsequent loading on the aircraft at such gates, movement of the gondolas taking place selectively by means of a series of eight cargo elevators 230 as disclosed in FIGS. 2, 5, 6 and 14. These elevators 230 function only to transport cargo upwardly to a distribution area 232 (see FIG. 14) on the fourth floor level 4L where such cargo is further processed and then selectively placed on the radially extending shuttles 110 for transfer to selected elevators 170 where the cargo is transported downwardly for aircraft loading purposes as will be made clear subsequently. In the interests of brevity, when considering elevator movements, such elevators as function solely for upward movement of cargo will be referred to as "up elevators" and, similarly, such elevators as function solely for downward movement of cargo will be referred to as "down elevators."

Before considering the track and elevator arrangement whereby cargo is elevated from below grade level BL, distributed in the area 232 on the fourth floor level 4L, placed on the shuttles 110, conducted to the elevator groups 170, and lowered to ground level outside the building for loading an aircraft, it is deemed pertinent to distinguish the gondola track arrangement 24 of FIG. 6 from the mass transit track arrangement 20 which leads into the northeast wing 72 of the building at below grade level. Accordingly, the mass transit tracks 20 are shown in heavier lines than the gondola tracks 24 and it is to be noted that the tracks 20 proceed in linearly straight fashion completely and longitudinally through the entire building 14. However, at longitudinally spaced regions along the building, the tracks 20 arch upwardly and extend in the ground floor level GL where they travel longitudinally for short distances as indicated at 236 in FIG. 5, after which they return to the below ground level GL. These rises in elevation of the tracks 20 are accompanied by passenger stops where passengers may leave the cars on such ground floor level in the vicinity of the desired airline company facilities. It is to be noted that at the various regions where the tracks 20 extend below grade level, crossings 237 (see FIG. 5) are provided for the movement of vehicles from one side of the parking area on the ground floor level to the other side thereof.

Returning now to a discussion of the gondola cargo track and elevator system, and referring particular to FIGS. 2, 6, 9 and 14 of the drawings wherein the aforementioned eight elevators 230 appear, these elevators are all up-elevators and they extend upwardly from below grade level BL through ground level GL, second floor level 2L, third floor level 3L and fourth floor level 4L and communicate with the aforementioned distribution area 232. This distribution area is disposed on the fourth floor level 4L, is of circular configuration, immediately underlies the annular hotel complex 90, as well as the sheltered courtyard 92, and communicates with the proximate or inner ends of the four dual-track shuttles 110.

Referring now to FIGS. 13 and 14, a rectangular tubular three-level track-supporting enclosure 240 extends around the building line and supports three series or levels of tracks 24 at the mezzanine level ML, the third level 3L and the fourth level 4L (see also FIGS. 19 to 22, inclusive). The various elevators 170 project into the track-supporting enclosure 240 and communicate with the various track levels thereof for purposes that will become clear presently.

Still considering the distribution of gondola-packaged cargo from the cargo holding means which is defined by the basement level BL of the main terminal building 14, the gondolas 25 have been transported through a given elevator 240 to the distribution area 232 are caused to enter the proximate end of one of the overhead cargo shuttles 110, after which they are conducted radially outwardly along the shuttle tracks to the distal end of the shuttle where they enter short elevators 242 which extend downwardly and communicate with the uppermost of the three levels of the aforesaid enclosure 240, the latter lying at the fourth building level 4L.

The system of cargo tracks 12 which extend around the uppermost level of the enclosure 240 is fragmentarily shown in FIG. 9 wherein six rows of tracks are disclosed. The two outermost tracks 24 are express tracks, the inside track conducting the gondola cars in a clockwise direction around the building 14 as viewed in FIG. 2, and the outside track conducting the cars in a counterclockwise direction. The four central or intermediate tracks are local tracks and have switching facilities whereby any given gondola which has descended through the elevators 242 may be switched from any one track to any other track at the same level within the enclosure 240.

Bearing in mind that substantially all of the cargo-handling facilities including the tracks 24 at the below grade level (see FIG. 6), the eight elevators 230, the distribution area 232, and the express and local tracks 24 within the enclosure 240 at the upper level thereof are enplaning cargo facilities, the various tracks 24 at such level make it possible to direct any given gondola which is delivered by the shuttle 110 to any selected elevator contained in a large number of groups or banks of enplaning elevators 250, there being four elevators in each bank and the various banks being spaced around the building 14 in the vicinity of the various gates 114. The banks of elevators 250 are of full building height as best seen in FIG. 13, and they are all down-elevators. Thus, when it has been ascertained that a given gondola shall be assigned to a particular gate, it will be computer-programmed and conducted by the switching arrangement at the upper level of the enclosure 240 for descent in one of the eight down-elevators 250 adjacent to such gate. Such gondola, upon arrival within an elevator 250 at ground level, i.e., at the level of the aircraft ramp 84, will be conducted by means of a selected cargo conveyor 252 (see FIG. 13) and deposited in the proper aircraft which is undergoing loading. When cargo enplaning operations are in progress, the various cargo conveyors 252 are operated in unidirectional fashion to conduct the cargo from the elevators 250 to the departing aircraft.

Both interline and online cargo-handling operations involve the programming of cargo in the intermediate track level of the track enclosure 240 and the use of additional banks of elevators 254 (see FIG. 10). By "interline" is meant the transfer of cargo between aircraft of different airline companies. By "online" is meant the transfer of cargo between aircraft of the same airline company. The tracks 24 of the intermediate level which is coplanar with the third floor level of the building 14 are similar in their arrangement to the tracks of the upper level of the enclosure 240 and include inside and outside tracks, together with four intermediate tracks. The banks of elevators 256 consist of two up-elevators and two down-elevators. Such elevator banks are not full height elevators and they extend from ground level only to the third floor building level 3L where they communicate with the intermediate track level within the enclosure 240. As shown in FIGS. 19, 20, 21 and 23 of the drawings, each track level within the enclosure 240 embodies siz parallel tracks, five of which lie outside the building line 118 while a single track lies within the building line. This disposition of tracks is preserved around the entire perimeter of the building including the narrow neck portions 76 by means of which the triangular wing sections 72 and 74 are connected to the central section 70 of the main terminal building 14. The aforementioned third floor balconies 117 contain an additional series of six tracks 24 as shown in FIG. 23, these tracks representing gondola holding areas within the balcony.

As shown in FIG. 13, either interline or online cargo is conducted between the aircraft and the banks of elevators 256 by two-way conveyors 260. Outgoing or enplaning cargo descends the down-elevators 256 and is conducted outwardly to the aircraft on the conveyor 260, while incoming cargo is conducted from the aircraft on the conveyor 260 and ascends the up-elevators 256.

The transportation of food between the aircraft and the food or flight kitchens 190 (see FIGS. 9 and 14) involves the use of the lower track level of the track enclosure 240 as shown in FIG. 11. Such track level is coplanar with the mezzanine level ML of the main terminal building 14. The track arrangement Ml this level is similar to that which is employed on the upper and intermediate track levels of the track enclosure 240 and the various tracks 24 have associated therewith banks of food elevators 261 which are of less height than the banks of elevators 256 and extend only to such mezzanine level. These latter elevators have up and down components, however, the switching arrangement which is associated with the tracks 24 this level includes branch track lines 262 leading to and from the flight kitchens 190. As shown in FIG. 13, the two-way conveyors 260 serves the banks of food elevators 261.

As shown in FIGS. 12 and 13 of the drawings, yet another bank of short elevators 264 is associated with each elevator group 170, the four elevators associated with such bank being all down-elevators. These elevators are provided for special deplaning operations as, for example, the removal of cargo or empty cargo containers or gondolas from an aircraft and return thereof to the outlying freight transfer building 16. The cargo or containers are conducted from the aircraft on a conveyor 270 (see FIG. 13) and caused to enter the elevators 264 at ground level, from whence such cargo may descend to the below grade level BL, where it may be switched onto the return line 228 which leads through the building 14 and, as shown in FIG. 5, extends to the transfer building 30. It will be understood, of course, that under special circumstances, it is possible to unload gondolas or other containers from the aircraft, cause the same to descend through the elevators 264 and then be variously switched from track to track at the below grade level and ultimately dispatched upwardly through the elevators 230 for a circuitous route across the elevated shuttles 110 as heretofore described in connection with enplaning operations. Alternatively, under special circumstances, such cargo may be elevated from ground level after such circuitous routes and treated as enplaning interline or online cargo in the manner previously described.

From the above description, it is believed that the nature and many advantages of the herein disclosed airport complex will be readily apparent. The invention is not to be limited to the exact arrangement of parts shown in the accompanying drawings or described in this specification as various changes in the details of construction may be resorted to without departing from the spirit of the invention. Therefore, only insofar as the invention is particularly pointed out in the accompanying claims is the same to be limited.

Having thus described the invention what I claim as new and desire to secure by letters patent is:

1. An integrated industrial and urban airport complex embodying a large tract of land and including a system of aircraft landing and take-off strips surrounding and defining an aircraft loading and unloading ramp area, a multi-level terminal building including a ground floor level and a second floor level located on said ramp area, and consisting of a central section having an outline which approximates that of a parallelogram, and a pair of end wing sections each of which has an outline which approximates that of a triangle, said wing sections being connected to the central section in equiangular apex-to-apex fashion so that converging sides of each wing section approximately constitute linear extensions of adjacent converging sides of the central section, the outline of the building as a whole thus assuming a bow tie configuration, means defining a series of bi-level passenger gates along each of the four sides of the central section and each of the three sides of each wing section, each of said gates embodying ground floor level defining facilities and second floor level enplaning facilities, said aircraft landing and take-off strips and the terminal building being disposed centrally of said tract of land, said multi-story terminal building embodying, in addition to said ground floor level and said second floor level, a below grade level and additional floor levels above said second floor level, and a flat roof above the uppermost floor level, an outlying freight transfer building disposed on said tract of land remote from the terminal building for the reception of incoming freight, cargo-carrying rails for the transportation of containerized cargo extending between the freight transfer building and the terminal building and entering the latter at below grade level, endless-type cargo conveyors projecting outwardly of the terminal building from said ground floor level and into the ramp area for conducting enplaning cargo to aircraft on the ramp area, track-switching facilities on said below grade level establishing a cargo-holding and distribution area for receiving cargo from said cargo-carrying rails, cargo shuttles on said roof, ramp up-elevators extending from said below grade level to said cargo shuttles, and cargo down-elevators extending from the shuttles to the ground floor level in the vicinity of said cargo conveyors.

2. An integrated industrial and urban airport complex as set forth in claim 1 and wherein the end sections are connected to the central section by short corridor neck portions, and means are provided defining at least one similar bi-level gate at the outer side of each neck portion.

3. An integrated industrial and urban airport complex as set forth in claim 1 and wherein the outer corners of each triangular end wing section and the outer corners of the central section are truncated in order to define linearly straight short building sides, and each of said latter building sides defines at least one bi-level gate.

4. An integrated industrial and urban airport complex as set forth in claim 1 and wherein said multi-level terminal building embodies, additionally, a below grade level, and a high-speed mass transit passenger railway consisting of incoming and outgoing tracks, enters the airport complex at ground level, passes beneath the strips, enters the building at the end of one of said triangular wing sections below grade level, passes completely and longitudinally through the building, and leaves said building from the end of the other triangular wing section below grade level.

5. An integrated industrial and urban airport complex as set forth in claim 4 and wherein said mass transit passenger railway enters the airport at one end thereof and leaves the airport at the other end thereof.

6. An integrated industrial and urban airport complex as set forth in claim 4 and wherein said mass transit passenger railway is flanked on opposite sides by multi-lane vehicular expressways which also pass completely through the terminal building at below grade level.

7. An integrated industrial and urban airport complex as set forth in claim 6 and wherein said mass transit passenger railway is provided with a series of upgrade and down-grade ramps leading to and from passenger boarding stations on the ground level of the building.

8. An integrated industrial and urban airport complex as set forth in claim 1 and wherein said cargo-carrying rails for the transportation of containerized cargo extend between the transfer building and one triangular end section of the terminal building.

9. An integrated industrial and urban airport complex as set forth in claim 8 and wherein said cargo-carrying rails which extend between the cargo transfer building and one of the triangular sections of the terminal building have interposed therein a cargo holding area consisting of a track switching arrangement.

10. An integrated industrial and urban airport complex as set forth in claim 8 and wherein certain of said cargo elevators extend upwardly from said track switching facilities on the below grade level and communicate with cargo-transporting shuttles on said roof, the shuttles communicate with certain others of the cargo elevators at peripheral regions of the building, and said latter cargo elevators extend to ground level in the vicinity of the cargo conveyors which lead to the aircraft on the ramp.

11. An integrated industrial and urban airport complex as set forth in claim 10 and wherein said shuttles are four in number and extend radially outwardly from the central region of said roof to the periphery of the latter.

12. An integrated industrial and urban airport complex as set forth in claim 1 and wherein the terminal building is further provided with a balcony-like mezzanine level immediately above one of said floor levels, kitchen facilities are disposed on said mezzanine level for the preparation of passenger flight meals, food elevators extend between the mezzanine level and the ground floor level, and additional endless-type conveyors project outwardly of the building from said ground floor level in the vicinity of the food elevators and into the ramp area for conducting food to aircraft on the ramp.

13. An integrated industrial and urban airport complex as set forth in claim 12 and wherein said food elevators consist of both up-elevators and down-elevators, and said additional conveyors are two-way conveyors.

14. An integrated industrial and urban airport complex as set forth in claim 3 and wherein the multi-level building is provided with a flat roof which is substantially coextensive with the outline of the building, a tower structure projects upwardly and centrally from said roof, and a multi-story inhabitable building encircles said tower structure, projects upwardly from said roof and, in combination with the tower structure, defines an internal sheltered courtyard area on the level of the roof.

15. An integrated industrial and urban airport complex as set forth in claim 1 and wherein a high-speed mass transit passenger railway which consists of incoming and outgoing tracks enters the airport complex at ground level, passes beneath the strips, and enters the terminal building through the wing sections at below grade level for the discharge of passengers within the buildings.

16. An integrated industrial and urban airport complex according to claim 14 and wherein heliport and vehicle parking facilities are formed on the roof exteriorly of the continuous inhabitable building.

17. An integrated industrial and urban airport complex including a system of aircraft landing and take-off strips surrounding and defining an aircraft loading and unloading ramp area, a multi-story terminal building located on said ramp area and embodying a ground floor level, a below grade level, a second floor level, additional floor levels above said second floor level, and a flat roof above the uppermost of said floor levels, means defining a series of bi-level passenger gates along the sides of the terminal building, a high-speed mass transit passenger railway consisting of incoming and outgoing tracks entering the terminal building at ground floor level, passing beneath the airstrips, entering the building at below grade level, and passing completely through the building in a longitudinal direction for the discharge of passengers at selected locations in the vicinity of the various gates, each gate embodying passenger enplaning and seating facilities including ticket issuing and baggage checking counters on the second floor level, and passenger deplaning facilities including baggage claiming counters on the ground lever, a down-escalator extending between the second floor level and the ground floor level in the vicinity of said passenger enplaning and passenger deplaning facilities, covered passageways projecting outwardly into the ramp area from the second floor level, a service and passenger corridor extending peripherally around the building on the second floor level on the outer side of said passenger enplaning facilities, and a main passenger corridor extending peripherally around the building on the second floor level on the inner side of said passenger enplaning facilities.

18. An integrated industrial and urban airport complex as set forth in claim 17 and wherein said down-escalators are disposed in the vicinity of the service and passenger corridor, and additional up and down escalators extend between the second floor level and the ground floor level in the vicinity of the main passenger corridor.

19. An integrated industrial and urban airport complex as set forth in claim 17 and wherein parking facilities for the vehicles of enplaning and deplaning passengers are provided on said roof.

20. An integrated industrial and urban airport complex as set forth in claim 19 and wherein said roof is further provided with a heliport for the landing and take-off of helicopters.

21. An integrated industrial and urban airport complex as set forth in claim 20 and wherein automobile rental offices are disposed on said roof in selected peripheral regions thereof.

* * * * *